1,003,344. STOWING MECHANISM.
James W. Cruikshank, Pittsburg, Pa.
Filed Feb. 11, 1911. Serial No. 607,973.

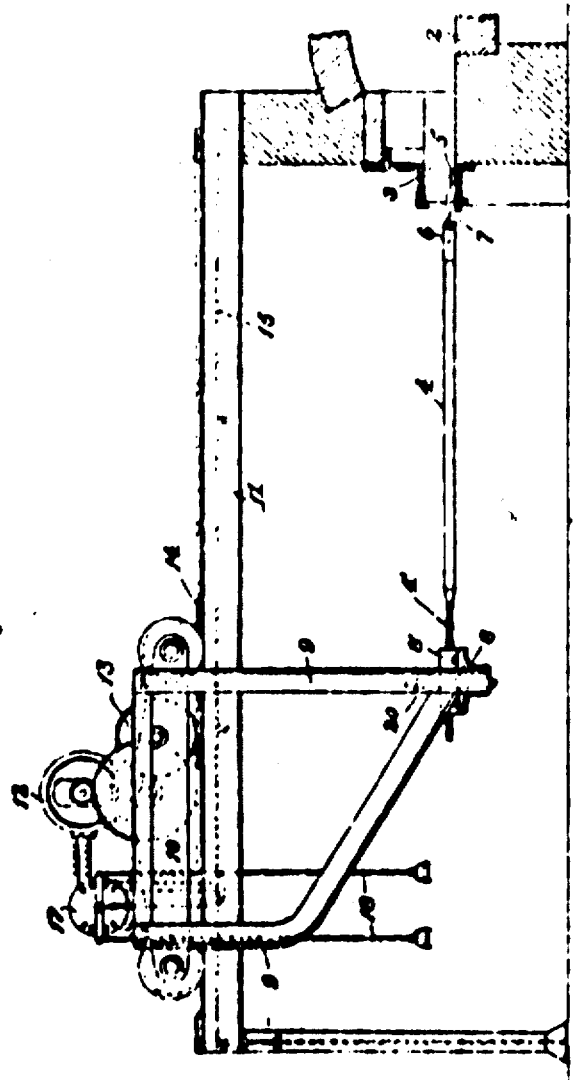

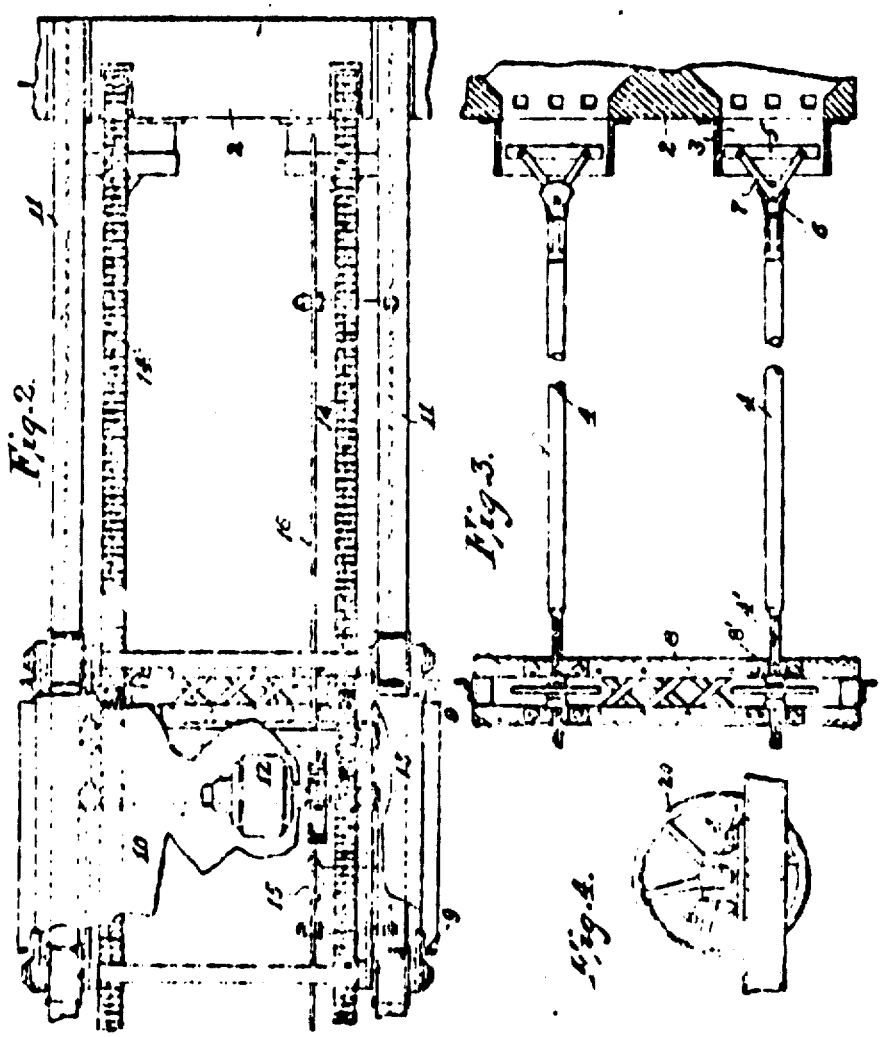

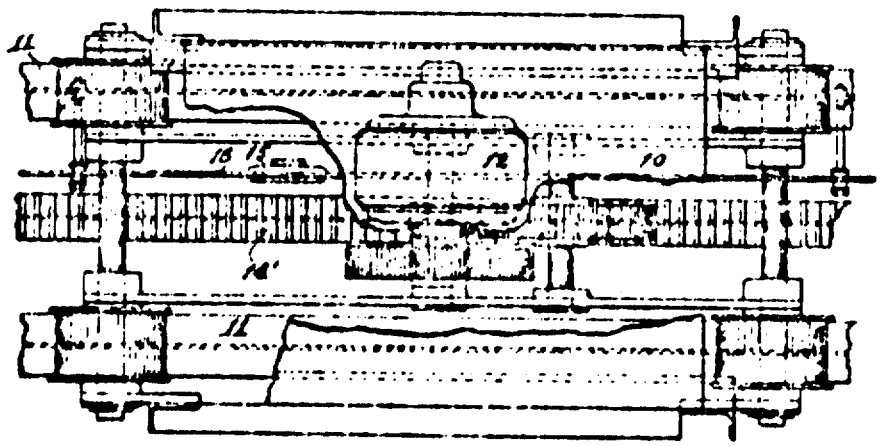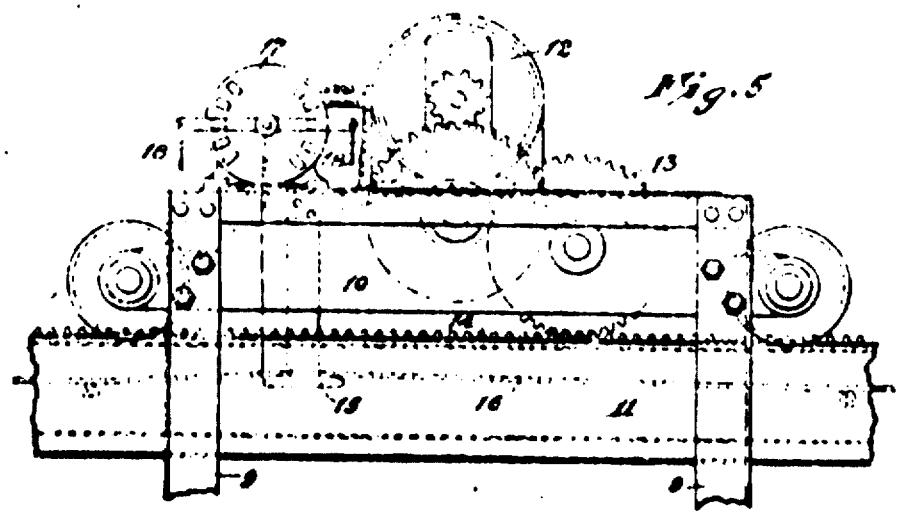

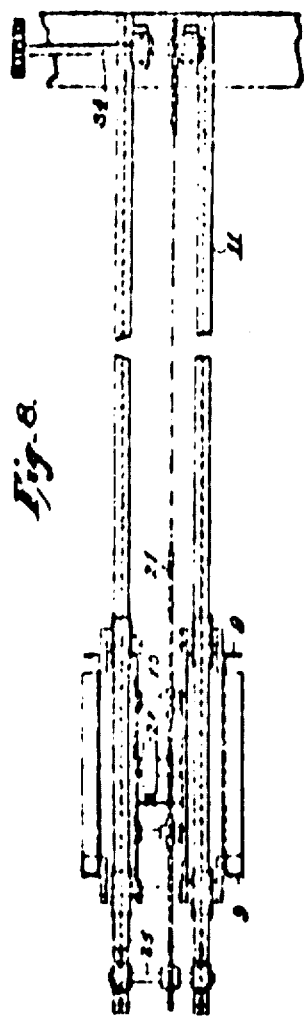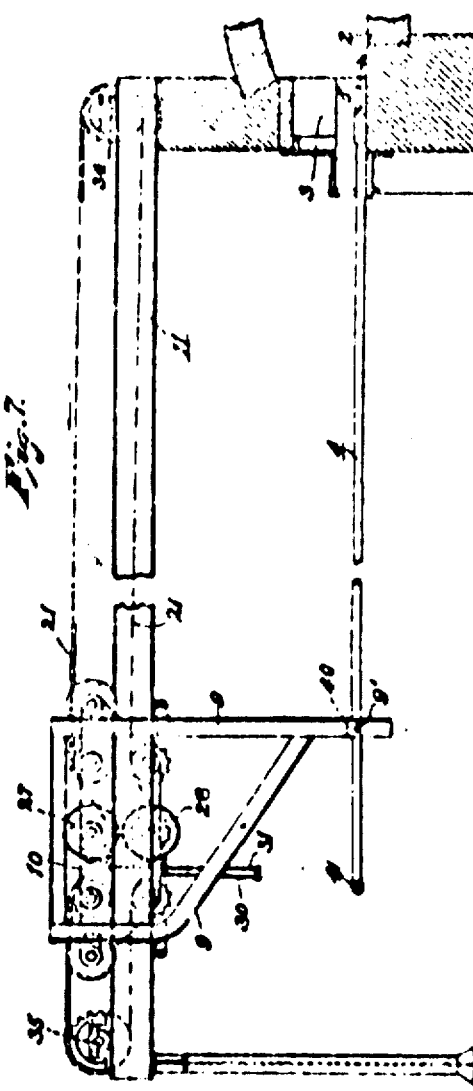

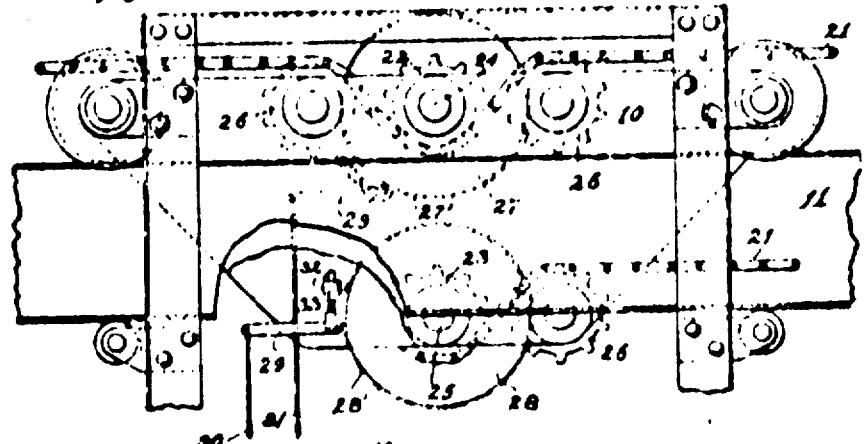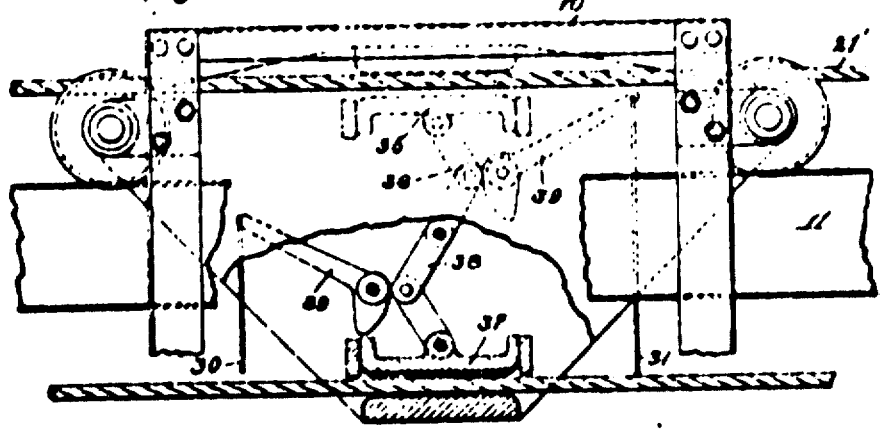

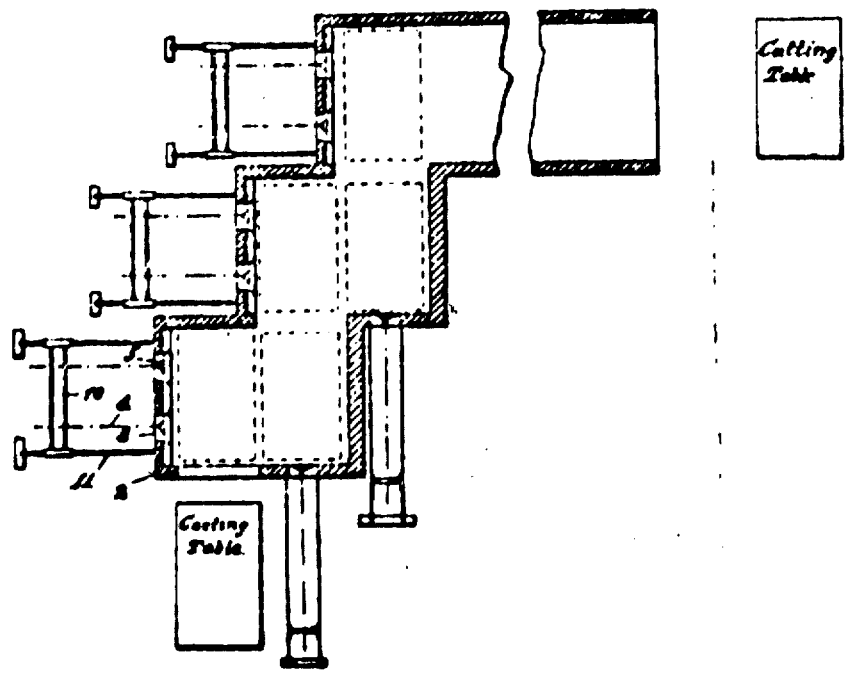

*To all whom it may concern*

Be it known that I, James W. Cruikshank, a resident of Pittsburg, in the county of Allegheny and State of Pennsylvania, have invented certain new and useful Improvements in Stowing Mechanism, of which the following is a specification.

The primary object of this invention is to provide efficient power apparatus for stowing sheets of glass, particularly rolled plate glass, as required in advancing the glass from one oven to another of an annealing leer, which effects a uniform movement of the entire plate without shock or jar, and without moving one portion of the plate farther than any other part thereof. This is preferably accomplished, particularly when moving a plate in the direction of its shorter dimension, by applying exactly the same stowing force simultaneously at more than one point, thus distributing the strains uniformly throughout the entire plate. Most of the breakage that occurs in annealing plate glass is due to inefficient stowing appliances rather than to careless work, and it is this loss and waste that the present invention obviates to a large extent.

In adapting power means for stowing, as distinguished from hand operated means, a further purpose is to provide for moving the stowing tools into engagement with the plate before the power mechanism is operated, thus establishing an accurate adjustment of the moving means so that when the power is applied the stowing operation proceeds with mechanical precision; also in this connection it may be stated that the preliminary adjustment provides for placing the stowing devices gently into engagement with the plate, and avoids jar or shock which might result if the engagement were effected by the power means.

A further and very important feature of the invention is the provision of controlling devices for the power means which are movable with the latter, and hence always immediately within reach of the operator stationed at the outer ends of the stowing tools, so that the entire movement is under his control and may be instantly manipulated to either start or stop the mechanism as required.

The invention is preferably, though not necessarily, embodied in apparatus which travels on an overhead support, thus freeing the floor of the casting room of numerous mechanical devices usually used in connection with stowing and which greatly obstruct the same.

In the accompanying drawings, Figure 1 is an elevation of a desirable form of stowing apparatus embodying the invention, a portion of one of the ovens of an annealing leer being shown in section. Fig. 2 is a top plan of the same with parts broken away, and Fig. 3 is a plan of the stowing tools and the power-operated support for their outer ends. Fig. 4 is a detail illustrating the adjustable connection between one of the tools and its support. Fig. 5 is an elevation of the upper portion of the operating mechanism drawn to a larger scale than in Fig. 1. Fig. 6 is a top plan, partly broken away, illustrating the mechanism applied to a single rack construction. Fig. 7 is an elevation, partly in section, of a construction of modified form, and Fig. 8 is a top plan of the same. Fig. 9 is a view on a larger scale of the carriage mechanism of Figs. 7 and 8, some of the parts being broken away, and Fig. 9ᵃ is a detail of one of the break-band and lever supports. Fig. 10 illustrates a further adaptation of the invention to an endless driving cable. Fig. 11 is a sectional plan of the ovens of an annealing leer, the stowing mechanism being shown diagrammatically.

Referring to Figs. 1 to 5, 2 designates one of the series of leer ovens shown in Fig. 11, and 3 are stowing openings formed in one of its side walls in which operates the stowing tools 4. The plate-engaging extremity of each tool consists preferably of a flat bar 5 which is pivotally connected at 6 to the inner end of the stowing tool by the V-shaped link 7, this pivotal connection permitting bar 5 to move into parallelism with the edge of the plate with the entire length of the bar engaging the same, as will be understood.

The outer portions of each pair of stowing tools 4 are supported in the transverse frame 8, and in the preferred embodiment this frame is sustained by hangers 9 depending from carriage 10 which is movable on the elevated track-forming supports 11. In the adaptation of Figs. 1 to 5, an electric motor 12 is mounted on the carriage and is connected by suitable intermediate gearing to the traction pinions 13 which engage the longitudinal fixed racks 14 paralleling supports 11. The carriage may be provided with a traveling contact or trolley 15 which moves over the current-supplying conductor 16. A controller 17 for motor 12 may be mounted on carriage 10, with operating cords 18 depending therefrom at the rear of frame 8, where the operator usually stands, and thus within convenient reach for stopping, starting or reversing the movement of the stowing tools. A single centrally located rack 14' may be substituted for two racks, as shown in Fig. 6.

The connection between the stowing tools and frame 8 is shown in Figs. 3 and 4, the rear portion of each tool being preferably in the form of a screw shaft 4', which is mounted in the open-top bearings 8' of frame 8 with an adjusting wheel 20 on each shaft 4' held in place by frame 8. By this means the stowing tools may be readily lifted from engagement with the frame, but when in position therein wheel 20 may be operated, frame 8 being at rest, for accurately adjusting the tool to the edge of the plate to be moved so that when carriage 10 is started movement is imparted directly to the plate and there is no shock or jar. And with a plurality of tools engaging the plate, as will be seen by referring to Fig. 11, the entire length of the plate is moved uniformly from one position to another without screwing or twisting, thus accomplishing the stowing operation with great accuracy.

As illustrated in Fig. 11, single stowing tools may be provided for moving the plates longitudinally from one oven to another, though I prefer to always move the plates with more than one tool where such an arrangement is practicable.

Instead of mounting the prime mover on the carriage, an endless drive chain 21 may be provided as in Figs. 7, 8 and 9, one course or lap thereof extending around pinion 22, and the other around a similar pinion 23, said pinions being carried, respectively, by shafts 24 and 25 journaled in frame 10, with the idler pinions 26 holding the drive chain in mesh with pinions 22 and 23, as shown. A brake wheel 27 is mounted on shaft 24, and a similar wheel 28 on shaft 25, with the wheels provided with brake bands 27' 28', respectively, the bands being operatively connected to like levers 29 from which depend the operating lines 30 and 31, respectively. It will be understood that levers 29 are connected to the free ends of the brake bands, with the opposite ends of the latter each secured to a bracket 32 projecting from frame 10, Fig. 9ª, the fulcrum of each lever 29 being an adjustable bolt 33 projecting from the bracket. Endless chain 21 extends around drive shaft 34 which may be connected to any suitable power means, the chain also passing around shaft 35 at the outer ends of supports 11. In the operation of this adaptation, shafts 24 and 25 are revolved idly by the constantly moving chain 21, but by drawing on one or the other of lines 30 and 31 the brake is applied to one or the other of wheels 27 or 28 as required for moving carriage 10 and the stowing mechanism toward or away from the leers, the mechanism being thus under instant and positive control, with the drive chain simply running idly through the carriage in both directions when the stowing mechanism is not in operation.

In Fig. 7, instead of adjustable connection between the rear end of the stowing tool and the supporting frame, the tool bar is extended and crooked at 40 to removably embrace pin 9' of frame 9, the extremity of the bar being provided with operating handle 41.

In the adaptation shown in Fig. 10, an endless cable 21' is shown with the opposite grips 36 and 37 for gripping the opposite courses of the cable and thus moving carriage 10 in one direction or the other as desired. The grips may be operated by suitable toggle mechanisms 38 in conjunction with the cam levers 39 from which depend the operating lines 30 and 31.

While in each of the adaptations shown the operating mechanism moves on an overhead support, the invention is not thus restricted, though it is a characteristic of the invention to have movement-controlling means travel with the mechanism which imparts motion to the stowing tools and conveniently accessible at all times to the operator.

I claim:

1. Glass stowing apparatus comprising a carriage, carriage actuating means, means traveling with the carriage for controlling its movement, and sheet-glass stowing means actuated by the carriage.

2. Glass stowing apparatus comprising a carriage, means for actuating the carriage in reverse directions, means traveling with the carriage for controlling its movement, and sheet-glass stowing means adjustably connected to and actuated by the carriage.

3. The combination of a plate glass annealing leer, an elevated support, a carriage movable on the support, carriage moving means, means traveling with and depending from the carriage for controlling its movement, and stowing means for the leer actuated by the carriage.

4. The combination of a plate glass annealing leer, a plurality of stowing devices for each plate, and means for actuating said stowing devices in unison.

5. The combination of a plate glass annealing leer, a plurality of stowing devices for each plate, means for simultaneously actuating said devices and an adjustable connection between each of said devices and the actuating means.

6. The combination of a plate glass annealing leer, a frame movable toward and from the leer, and a plurality of stowing devices for the leer each adjustably connected to the frame.

7. The combination of a plate glass annealing leer, a frame movable toward and from the leer, frame moving means, means traveling with the frame for controlling its movement, and a plurality of stowing devices for the leer connected to the said frame.

8. The combination of a plate glass annealing leer open for affording two points of access to the same edge of a plate, two stowing tools, and actuating means common to the two tools for actuating them in unison.

9. The combination of a plate glass annealing leer open for affording two points of access to the same edge of a plate, two stowing tools, tool actuating means movable toward and from the leer, and an adjustable connection between each tool and the actuating means.

10. Glass stowing apparatus comprising a carriage movable toward and from a leer, a stowing tool extending from the carriage into the leer, and hand-adjusting means mounted on the carriage for varying the position of the stowing tool relatively thereto.

11. Glass stowing apparatus comprising a carriage movable toward and from a leer, a stowing tool having its inner end operative within the leer and its outer end supported by the carriage, and a hand-actuated screw adjustment mounted on the carriage for adjusting the tool relatively thereto.

12. Glass stowing apparatus comprising a carriage movable toward and from a leer, a stowing tool having its inner end operative within the leer and its outer end threaded and slidably mounted in the carriage, and a hand wheel mounted in the carriage and on the threaded portion of the tool for adjusting the latter relatively to the carriage.

13. Glass stowing apparatus comprising a carriage, means for moving the carriage toward and from a leer, a stowing tool having its inner end operative within the leer and its outer end supported by the carriage, means on the carriage for adjusting the tool relatively thereto, and means adjacent to and movable with the carriage for controlling the movement of the latter.

14. The combination of a plate glass annealing leer, an elevated support, a carriage movable on the support, carriage moving means, means traveling with and depending from the carriage for controlling its movement, stowing means extending from the carriage to the leer and actuated by the former, and means on the carriage for adjusting the position of the stowing means relatively thereto.

15. The combination of a plate glass annealing leer, a stowing tool projecting thereinto, a carriage movable toward and from the leer for operating the tool, and carriage actuating motor means movable with the carriage.

16. The combination of a plate glass annealing leer, an elevated support, a carriage movable on and depending from the support, a stowing tool projecting into the leer and connected to and operated by the depending carriage, and a carriage-actuated motor mounted to travel with the carriage.

In testimony whereof I affix my signature in presence of two witnesses.

JAMES W. CRUIKSHANK.

Witnesses:
J. M. NESBIT,
F. E. GAITHER.